United States Patent [19]

Masaki

[11] Patent Number: 4,869,577

[45] Date of Patent: Sep. 26, 1989

[54] FERROELECTRIC LIQUID CRYSTAL DISPLAY DEVICE HAVING UNIAXIAL ALIGNMENT ON BOTH SUBSTRATES

[75] Inventor: Yuichi Masaki, Kawasaki, Japan

[73] Assignee: Canon Kabushiki Kaisha, Tokyo, Japan

[21] Appl. No.: 75,979

[22] Filed: Jul. 21, 1987

[30] Foreign Application Priority Data

Jul. 22, 1986 [JP] Japan ................................. 61-170894

[51] Int. Cl.$^4$ ............................................... G02F 1/13
[52] U.S. Cl. .................................. 350/350 S; 350/340; 350/341
[58] Field of Search ................. 350/341, 339 R, 350 S, 350/340

[56] References Cited

U.S. PATENT DOCUMENTS

| | | | |
|---|---|---|---|
| 4,367,924 | 1/1983 | Clark et al. | 350/350 S X |
| 4,639,089 | 1/1987 | Okada et al. | 350/341 |
| 4,662,721 | 5/1987 | Harada et al. | 350/339 R |
| 4,664,480 | 5/1987 | Geary et al. | 350/350 S X |
| 4,712,873 | 12/1987 | Kanbe et al. | 350/350 S X |

FOREIGN PATENT DOCUMENTS

| | | | |
|---|---|---|---|
| 60-57821 | 4/1985 | Japan | 350/350 S |
| 62-50731 | 3/1987 | Japan | 350/350 S |

OTHER PUBLICATIONS

Kondo, K. et al., "Preparation of Monodomain Cells of Ferroelectric Liquid Crystals . . .", *Japanese J. Applied Physics*, vol. 20, No. 10 (Oct. 1981), pp. 1773–1777.

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

A liquid crystal display device comprises a pair of substrates each provided with a transparent electrode, and a ferroelectric liquid crystal disposed therebetween. One of the substrates has thereon a homogeneous alignment, and the other substrate has thereon a tilted alignment film for aligning liquid crystal molecules in contact therewith in a tilted direction with respect to the face thereof. The combination of the two-types of alignment films provides a monodomain of uniformly aligned ferroelectric liquid crystal molecules, which leads to an improved display characteristic including increased contrast.

30 Claims, 2 Drawing Sheets

FERROELECTRIC LIQUID CRYSTAL DISPLAY DEVICE HAVING UNIAXIAL ALIGNMENT ON BOTH SUBSTRATES

FIELD OF THE INVENTION AND RELATED ART

The present invention relates to a liquid crystal display device using a ferroelectric liquid crystal in combination with a characteristic alignment control technique.

Hitherto, a ferroelectric liquid crystal device using a ferroelectric liquid crystal has been greatly expected to be applied as a large-size display device having a large display capacity because it has a high response speed as well as a memory characteristic. In order to realize a display using a ferroeletric liquid crystal, however, there have been left many problems to be solved in respects of liquid crystal material, molecular alignment technique, production of an ultra thin panel, and a highly multiplex driving system.

As for a molecular alignment technique among these problems, it has been practiced as in the conventional TN-type display cell to form a film of a polymer such as polyimide and polyvinyl alcohol on a substrate and rub the film in one direction. When a ferroelectric liquid crystal is injected in this type of cell, however, several defects have been observed, such as failure to provide a uniform molecular alignment resulting in local absence of memory characteristic and insufficient contrast. As another alignment technique, U.S. Pat. No. 4,639,089 has proposed to subject a film of a polyimide, polyvinyl alcohol, etc., formed on a substrate to oblique etching. Further, U.S. Pat. No. 4,662,721 has proposed to form a uni-axial alignment layer on one substrate and a random homogenous alignment layer on the other substrate.

SUMMARY OF THE INVENTION

An object of the present invention is to provide a liquid crystal display device, which has a more improved alignment characteristic to provide a high contrast and a memory characteristic more uniformly.

Another object of the present invention is to provide a liquid crystal display device having a large picture area and a high resolution.

According to the present invention, there is provided a liquid crystal display device comprising a pair of substrates each provided with a transparent electrode, and a ferroelectric liquid crystal disposed therebetween, wherein one substrate has thereon a first alignment film provided with a homogeneous aligning treatment, and the other substrate has thereon a second alignment film provided with a tilt aligning treatment for aligning liquid crystal molecules in contact therewith in a tilted direction with respect to the face thereof.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
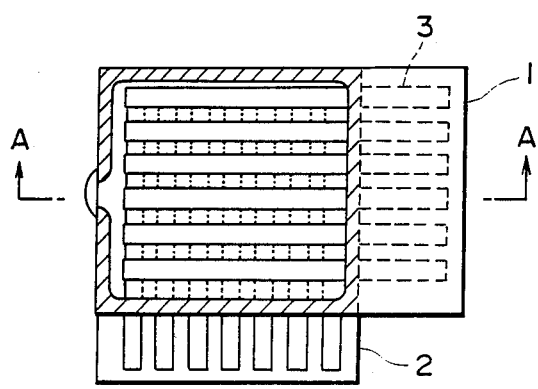
FIG. 1 is a schematic plan view of a partially cut-away liquid crystal display device according to the invention.
Figure 2:
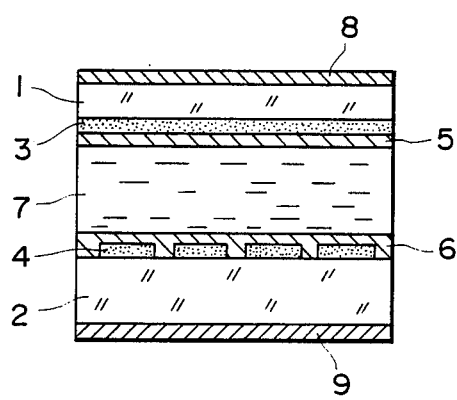
FIG. 2 is a sectional view of the device taken along the line A-A in FIG. 1.

FIG. 1 is a schematic plan view of an embodiment of the liquid crystal display device in a partially cut-away state, and FIG. 2 is a sectional view taken along the line A—A. Referring to FIGS. 1 and 2, the liquid crystal display device comprises an upper electrode plate comprising an upper substrate 1 of a glass plate, a plastic plate, etc., and transparent electrodes 3 and an alignment film 5 provided with a homogeneous aligning treatment formed on the substrate 1; a lower electrode plate comprising a lower substrate 2 of a glass plate, plastic plate, etc., and transparent electrodes 4 and an alignment film 6 provided with an oblique aligning treatment formed thereon for aligning liquid crystal molecules in contact therewith at a sufficiently large angle; a liquid crystal layer 7 disposed between the upper and lower electrode plastes; and polarizers 8 and 9 disposed outside the upper and lower substrates 1 and 2.

The liquid crystal layer 7 comprises a ferroelectric liquid crystal which may preferably be selected from the Schiff base-type, ester-type and biphenyl-type ferroelectric liquid crystals. Representative examples thereof will be shown hereinbelow with their structural formulas. The liquid crystal compounds may be used in the form of a mixture of two or more species selected from one or more types.

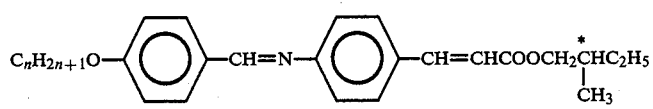

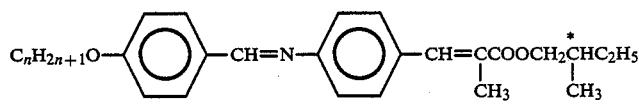

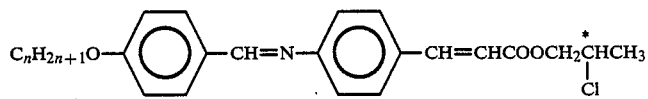

-continued

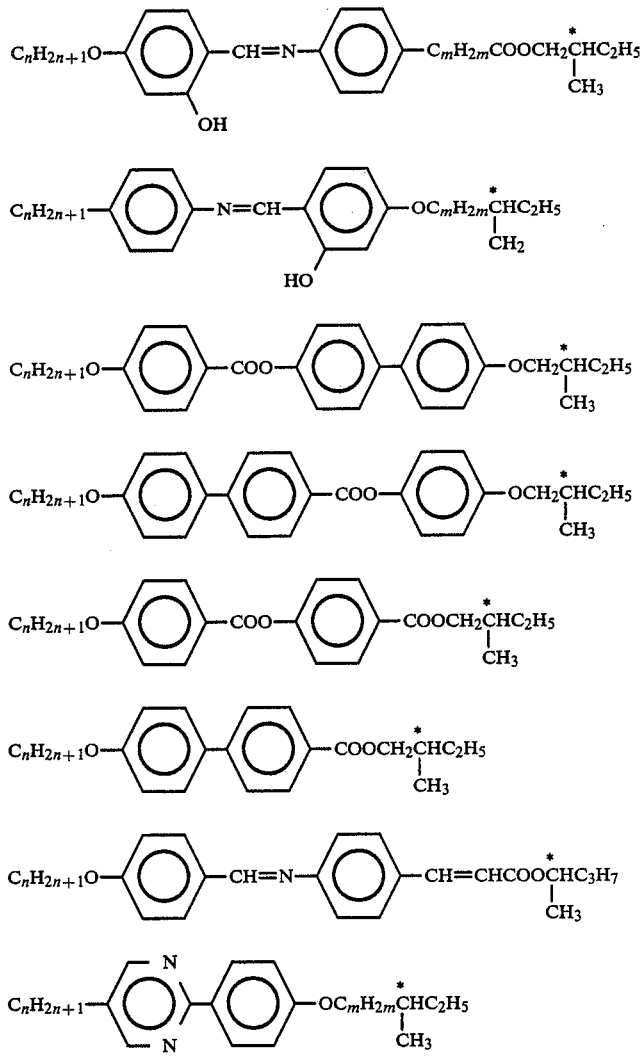

In order to provide one substrate with an alignment film which has been subjected to a homogeneous aligning treatment in the liquid crystal display device according to the present invention, a substrate having thereon patterned electrodes may be coated with an insulating film such as that of polyimide, polyamide, $SiO_2$, SiO or $TiO_2$ by an ordinary coating method such as spinner coating, printing or dipping, followed by rubbing of the film; or by formation of such an insulating film by oblique vapor deposition.

Next, a process for providing the other substrate with an alignment film having a function of aligning liquid crystal molecules in the same direction at a sufficiently large angle with respect to the substrate face will be explained hereinbelow with reference to FIGS. 3A to 3E.

Figure 3A:
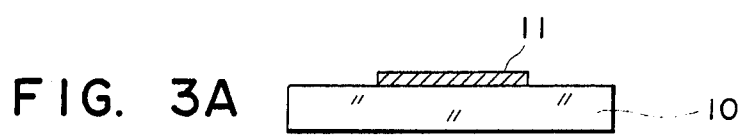
FIGS. 3A–3E are schematic side view of a substrate for explaining steps involved in the oblique aligning treatment applied to the substrate.
Figure 3B:
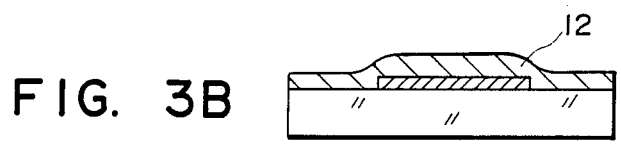
Figure 3C:
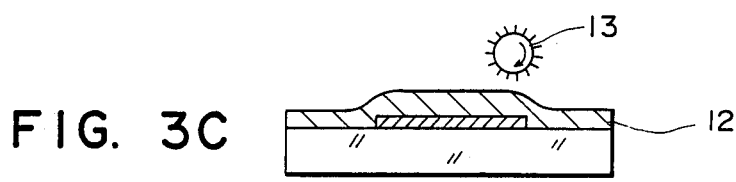
Figure 3D:
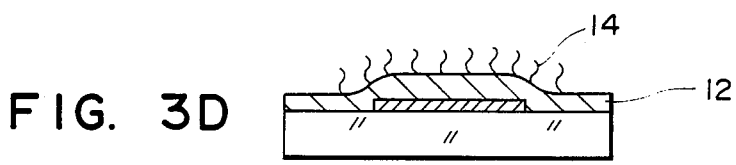
Figure 3E:
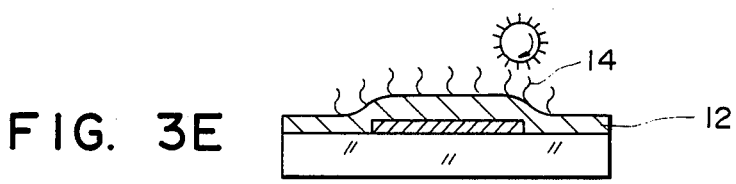

Referring first to FIG. 3A, an electrode pattern 11 is formed on a substrate 10, and then a polymer film-forming material such as polyimide is applied thereon, followed by heat-curing thereof, to form an alignment film 12 as shown in FIG. 3B. Then, as shown in FIG. 3C, the alignment film 12 is rubbed in one direction by moving a rubbing roller 13 the peripheral surface of which is coated with a cotton cloth, etc., while rotating the roller, whereby a homogeneous alignment treatment is effected. Further, as shown in FIG. 3D, a homeotropic alignment film 14 is formed on the alignment film 12, and a uniaxial aligning treatment such as rubbing is applied thereto as shown in FIG. 3E, i.e., similarly as shown in FIG. 3C.

The homeotropic aligning film may be formed of, for example, a surfactant having a fluorinated carbon chain (e.g., Daikin FS-150 (trade name)), a silane compound having a fluorinated carbon unit (e.g., Daikin FS 116 (trade name)), a quarternary ammonium salt surfactant (e.g., N-dimethyl-N-octadecylaminopropylmethoxysilane), lecithin, or hexadecyl amine.

In another preferred embodiment of the present invention, an oblique alignment film may be provided by forming an oblique vapor deposition film on an electrode pattern, and applying thereon a homeotropic alignment film as described above which is then subjected to a uniaxial aligning treatment as described.

In a liquid crystal display device of the present invention, one substrate is provided with an alignment film subjected to a homogeneous aligning treatment, and the other substrate is provided with an alignment film having a function of aligning liquid crystal molecules in contact therewith in a tilted direction at a sufficiently large angle (about 10 degrees or more and about 60 degrees or less as measured by the crystal rotation method) from the substrate face. As a result, when at least two stable states formed in a non-helical structure of a ferroelectric liquid crystal are developed, it is presumed that twist alignment of liquid crystal molecules between the substrates are minimized whereby a monodomain of uniform liquid crystal alignment free of twist alginment is obtained.

As described hereinabove, according to the liquid crystal display device of the present invention, a uniform monodomain of liquid crystal alignment of a ferroelectric liquid crystal is readily obtained, and also a display quality such as contrast is improved.

Further, when a prescribed AC voltage (e.g., AC voltage of 200 Hz and 10 volts) is applied to the liquid crystal device according to the prevent invention, an increase in tilt angle is observed compared with that before the AC voltage application, whereby a display device having an increased contrast can be provided.

Hereinbelow, the present invention will be explained by way of a more specific example.

EXAMPLE 1

A glass substrate provided with pattern electrodes was coated with a polyimide solution (SP-510 mfd. by Toray K. K., 2% solution in N-methylpyrrolidone) by means of a spinner coater under the conditions of 2000 rpm and 20 sec, followed by heating at 300° C. for 1 hour to form an insulating film. After the curing, the polyimide film was subjected to rubbing (a 50 mm-dia. roller covered with 2 mm-long cotton fiber was pressed to provide a 0.3 mm-long bending part of the fiber and moved for three reciprocations while rotated at 1000 rpm) as a homogeneous aligning treatment to obtain an upper electrode plate.

Then, another glass substrate provided with pattern electrodes was coated with a polyimide insulating film similarly as the above, and then further coated with a homeotropic aligning agent ("FS 116", mfd. by Daikin K. K., a fluorine-containing silane) by means of a spinner coater under the conditions of 2000 rpm and 20 sec., followed by heating at 150° C. for 60 minutes and rubbing in the same manner as described above, to prepare a lower electrode plate.

The upper and lower electrode plates thus prepared were bonded to each other with their rubbing directions in parallel with each other, and with a sealing spacer therebetween to provide a cell gap of about 1.5 $\mu$, into which an ester-type ferroelectric liquid crystal ("CS-1011" (trade name), mfd, by Chisso K. K.) was injected, and the injection port was sealed up to provide a desired liquid crystal display device.

The thus prepared liquid crystal device could provide a uniformly large contrast and realize a highly multiplex driving by utilizing the memory characteristic.

More specifically, the thus prepared cell provided a tilt angle of about 20° and a contrast (transmittance ratio between the bright and the dark states) of about 10:1 under the application of a voltage of 30 volts.

The tilt angle was measured in the following manner. A liquid crystal cell is supplied with an electric field to orient the liquid crystal molecules to one stable state. The liquid crystal cell is relatively rotated with respect to a pair of right angle cross nicol polarizers to find a darkest state position where the transmittance assumes a minimum. Then, an electric field of the other polarity is applied to the cell to orient the liquid crystal molecules to the other stable state. Then, the liquid crystal cell is again rotated to find a darkest state position. The tilt angle $2\theta$ is obtained by measuring the angle of rotation of the cell providing the two darkest state positions. The two darkest state positions correspond to the average molecular axis directions in the two stable states.

EXAMPLE 2

An upper electrode plate was prepared in the same manner as in Example 1.

Another glass substrate was placed in a vacuum evaporator evacuated to $10^{-6}$ Torr, in which 10 g of SiO powder charged in a boat of molybdenum was vapor-deposited onto the glass plate at an incident angle of 5° to form a 2000 Å-thick film. The glass plate was then taken out from the evaporator and coated with a homeotropic aligning agent ("FS-116") by means of a spinner coater of 2000 rpm and 20 sec, followed by heating at 150° C. for 60 minutes and rubbing in the same manner as described in Example 1 to prepare a lower electrode plate.

A liquid cystal display device was prepared in the same manner as in Example 1 except for the use of the thus prepared upper and lower electrode plates.

The liquid crystal display device could provide a uniformly large contrast and a highly multiplex driving with utilization of the memory characteristic similarly as in Example 1.

COMPARATIVE EXAMPLE

An upper electrode plate was prepared in the same manner as in Example 1.

Another glass substrate was coated with a homeotropic aligning agent ("FS-116") by spinner coating of 2000 rpm and 20 sec, followed by heating at 150° C. for 60 minutes, to prepare a lower electrode plates.

A liquid crystal device was prepared in the same manner as in Example 1 except for the use of the thus prepared upper and lower electrode plates.

The contrast and tilt angle of the thus prepared liquid crystal device were measured in the same manner as in Example 1. The results are shown below together with those of Example 1.

|  | Contrast | Tilt angle |
|---|---|---|
| Comparative Example | 4:1 | about 10° |
| Example 1 | 10:1 | about 20° |

What is claimed is:

1. A liquid crystal display device, comprising: a pair of substrates each provided with a transparent electrode having a ferroelectric liquid crystal disposed therebetween, wherein one substrate has thereon a homogeneous alignment film provided with a uniaxial orientation treatment, and the other substrate has thereon an alignment film obtained by coating said other substrate with a homogeneous alignment film and coating that alignment film with a homeotropic alignment film having a uniaxial orientation treatment.

2. A device according to claim 1, wherein said ferroelectric liquid crystal comprises a compound selected from the group consisting of Schiff's base-type, ester-type and biphenyl-type ferroelectric liquid crystal compounds.

3. A device according to claim 1, wherein said first alignment film has been obtained by coating said one substrate with an insulating film of polyimide or polyamide, and then rubbing the insulating film.

4. A device according to claim 3, wherein the insulating film is formed by a coating method selected from spinner coating, printing, and dipping.

5. A device according to claim 1, wherein said first alignment film has been obtained by coating said one substrate with an insulating film of $SiO_2$, SiO or $TiO_2$, and then rubbing the insulating film.

6. A device according to claim 1, wherein said first alignment film has been obtained by oblique vapor deposition of $SiO_2$, SiO or $TiO_2$.

7. A device according to claim 1, wherein said first alignment film has been obtained by vapor-depositing an insulating film of $SiO_2$, SiO or $TiO_2$, and then rubbing the insulating film.

8. A device according to claim 1, wherein said alignment film provided with a homogeneous aligning treatment has been formed by coating said the other substrate with a polymer film-forming material, followed by heating for curing and rubbing.

9. A device according to claim 8, wherein said polymer film-forming material is polyimide.

10. A device according to claim 1, wherein said uniaxial aligning treatment is a rubbing treatment applied to the homeotropic alignment film formed in advance.

11. A device according to claim 1, wherein said homeotropic alignment film comprises a surfactant having a fluorinated carbon chain.

12. A device according to claim 1, wherein said homeotropic alignment film comprises a silane compound having a fluorinated carbon chain.

13. A device according to claim 1, wherein said homeotropic alignment film comprises a quarternary ammonium salt surfactant.

14. A device according to claim 1, wherein said homeotropic alignment film comprises lecithin.

15. A device according to claim 1, wherein said homeotropic alignment film comprises hexadecyl amine.

16. A liquid crystal display device, comprising: a pair of substrates each provided with a transparent electrode having a ferroelectric liquid crystal disposed therebetween, wherein one substrate has thereon a homogeneous alignment film provided with a uniaxial orientation treatment, and the other substrate has thereon a second alignment film obtained by coating the other substrate with an alignment film formed by oblique vapor deposition, and coating that alignment film with a homeotropic film having a uniaxial orientation treatment.

17. A device according to claim 16 wherein said uniaxial aligning treatment is a rubbing treatment applied to the homeotropic alignment film formed in advance.

18. A device according to claim 16, wherein said ferroelectric liquid crystal comprises a compound selected from the group consisting of Schiff's base-type, ester-type and biphenyl-type ferroelectric liquid crystal compounds.

19. A device according to claim 16, wherein said first alignment film has been obtained by coating said one substrate with an insulating film of polyimide or polyamide, and then rubbing the insulating film.

20. A device according to claim 17, wherein said second alignment film aligns liquid crystal molecules in a tilted direction with respect to the face thereof.

21. A device according to claim 20, wherein the insulating film is formed by a coating method selected from spinner coating, printing and dipping.

22. A device according to claim 16, wherein said first alignment film has been obtained by coating said one substrate with an insulating film of $SiO_2$, SiO or $TiO_2$, and then rubbing the insulating film.

23. A device according to claim 16, wherein said first alignment film has been obtained by oblique vapor deposition of $SiO_2$, SiO or $TiO_2$.

24. A device according to claim 16, wherein said first alignment film has been obtained by vapor-depositing an insulating film of $SiO_2$, SiO or $TiO_2$, and rubbing the insulating film.

25. A device according to claim 16, wherein said homeotropic alignment film comprises a surfactant having a fluorinated carbon chain.

26. A device according to claim 16, wherein said homeotropic alignment film comprises a silane compound having a fluorinated carbon chain.

27. A device according to claim 16, wherein said homeotropic alignment film comprises a quaternary ammonium salt surfactant.

28. A device according to claim 16, wherein said homeotropic alignment film comprises lecithin.

29. A device according to claim 16, wherein said homeotropic alignment film comprises hexadecyl amine.

30. A device according to claim 16, wherein said second alignment film aligns liquid crystal molecules in a tilted direction with respect to the face thereof.

* * * * *

UNITED STATES PATENT AND TRADEMARK OFFICE
CERTIFICATE OF CORRECTION

PATENT NO. : 4,869,577
DATED : September 26, 1989
INVENTOR(S) : YUICHI MASAKI

It is certified that error appears in the above-identified patent and that said Letters Patent is hereby corrected as shown below:

COLUMN 1

Line 17, "ferroeletric" should read --ferroelectric--.
    Line 19, "respects" should read --respect--.
    Line 35, "uni-axial" should read --uniaxial--.

COLUMN 2

Line 18, "side view" should read --side views--.
    Line 39, "plastes;" should read --plates;--.

COLUMN 4

Line 55, "quarternary" should read --quaternary--.

COLUMN 5

Line 10, "alginment" should read --alignment--.
    Line 18, "prevent" should read --present--.

COLUMN 6

Line 38, "plates." should read --plate.--.

COLUMN 7

Line 36, "quarternary" should read --quaternary--.

UNITED STATES PATENT AND TRADEMARK OFFICE
CERTIFICATE OF CORRECTION

PATENT NO. : 4,869,577
DATED : September 26, 1989
INVENTOR(S) : YUICHI MASAKI

It is certified that error appears in the above-identified patent and that said Letters Patent is hereby corrected as shown below:

COLUMN 8

Line 3, "claim 16" should read --claim 16,--.

Signed and Sealed this

Ninth Day of July, 1991

Attest:

HARRY F. MANBECK, JR.

*Attesting Officer*        *Commissioner of Patents and Trademarks*